Dec. 26, 1961 P. S. JACKSON 3,014,393
INTERMITTENT FEEDING MECHANISM FOR USE
IN PUNCH PRESSES AND THE LIKE
Original Filed Feb. 7, 1952 5 Sheets-Sheet 1

INVENTOR.
Paul S. Jackson,
BY Schroeder, Hofgren,
Brady & Wegner
Attys.

Dec. 26, 1961  P. S. JACKSON  3,014,393
INTERMITTENT FEEDING MECHANISM FOR USE
IN PUNCH PRESSES AND THE LIKE
Original Filed Feb. 7, 1952  5 Sheets-Sheet 2

INVENTOR.
Paul S. Jackson,
BY Schroeder, Hofgren,
Brady & Wegner
Atty's

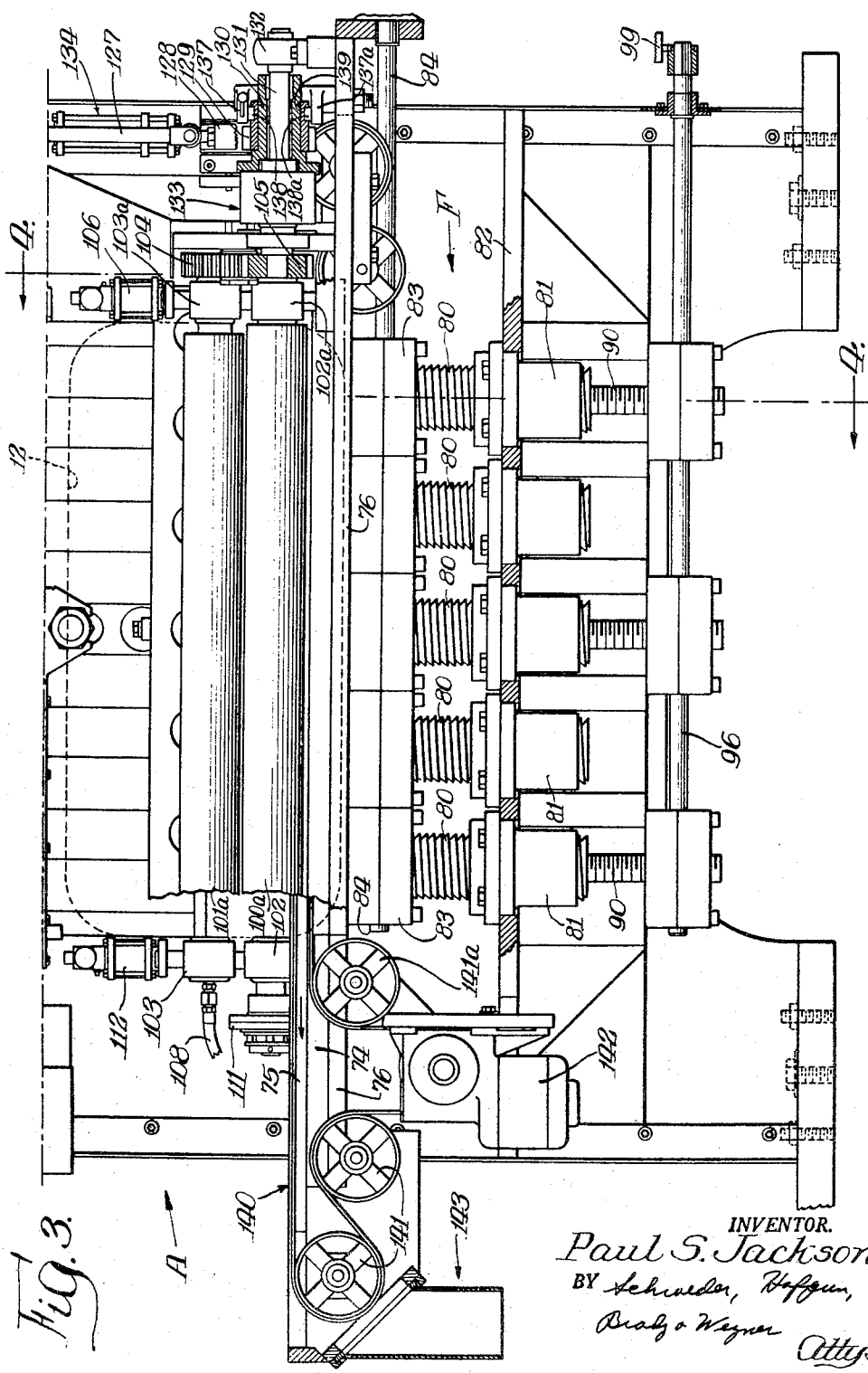

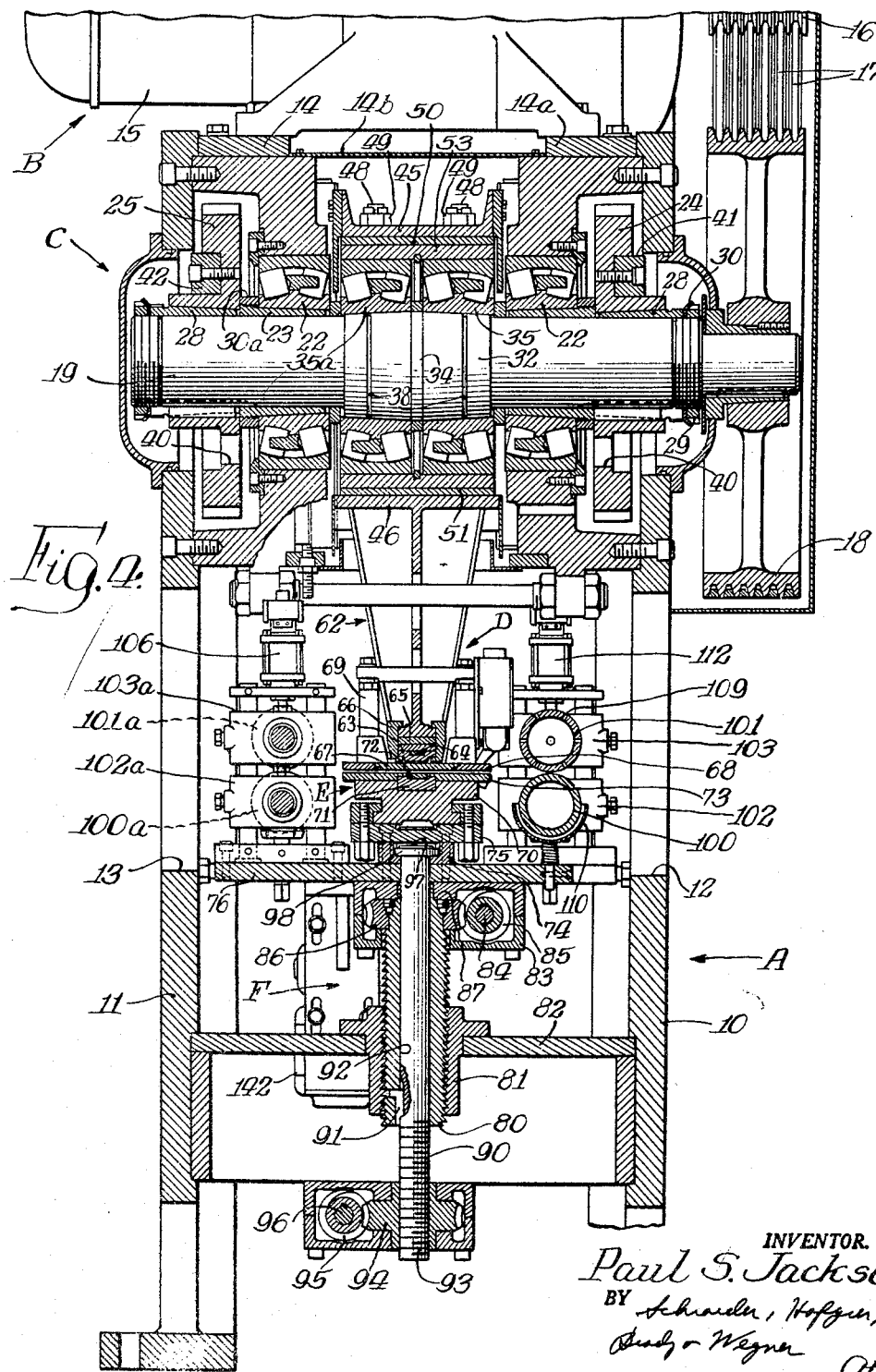

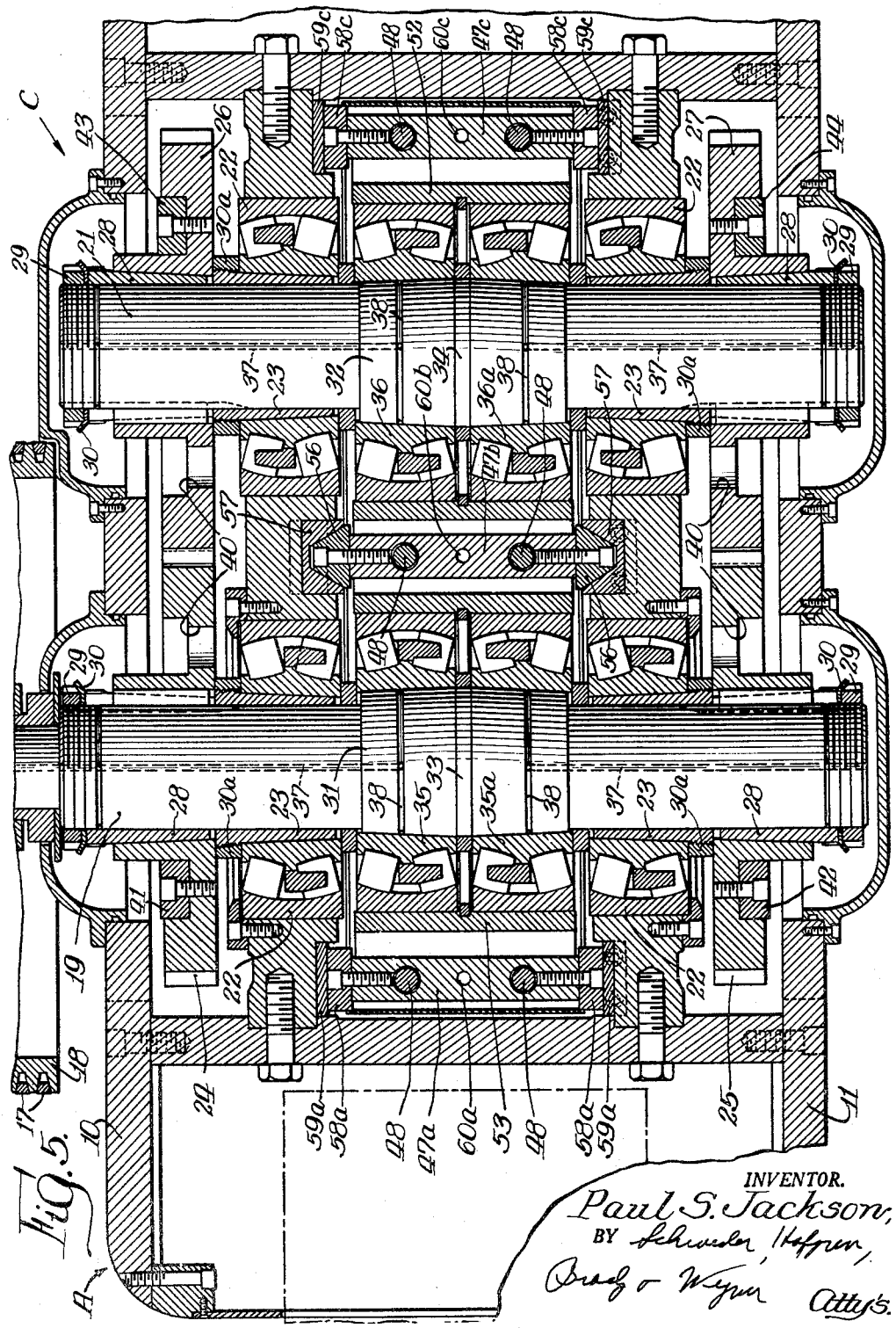

3,014,393
INTERMITTENT FEEDING MECHANISM FOR USE IN PUNCH PRESSES AND THE LIKE

Paul S. Jackson, Rockford, Ill., assignor to W. F. and John Barnes Company, Rockford, Ill., a corporation of Illinois Original application Feb. 7, 1952, Ser. No. 270,377. Divided and this application July 10, 1957, Ser. No. 671,021

2 Claims. (Cl. 83—257)

This invention relates to feeding mechanism and more particularly to means for feeding a work piece to a machine, such as a punch press.

It is the general object of this invention to produce new and improved apparatus as described in the preceding paragraph.

This application is a division of my pending application, Serial Number 270,377, filed February 7, 1952 which issued on October 8, 1957 as U.S. Patent No. 2,808,736.

A feature of the invention is the provision of a novel feed means for feeding a workpiece between the die and ram of a punch press which is operable either to move a workpiece at a feed rate or at a rapid rate so that a series of punches may be formed on a workpiece, with each series being spaced a predetermined amount. During the formation of each series of punches, the workpiece is moved at a feed rate to space the punch holes a predetermined amount, while the workpiece is moved at a rapid rate between each series of punches so as to space the series from one another along the length of the workpiece. Thus, the spacing can be achieved without slowing the ram or press.

Another feature of the invention is to mount the feed rolls which serve as a part of the feed mechanism just described on the movable die holder so that adjustment of the die holder relative to the ram does not affect the relationship between the feed rollers and the die.

Yet another feature of the invention is the provision of a feed means connected directly to one of the crossheads in a punch press or other machine of that general type so that the sliding movement of the crosshead produces oscillation of the feed mechanism. Thus, a feed can be achieved without the use of independently rotated cams and the like.

Other and further features and objects of the invention will be readily apparent from the following description and drawings, in which:

FIG. 3 is a front elevational view of the lower portion of the press showing a part of the feed mechanism and the means for adjusting the die;

Figure 2:
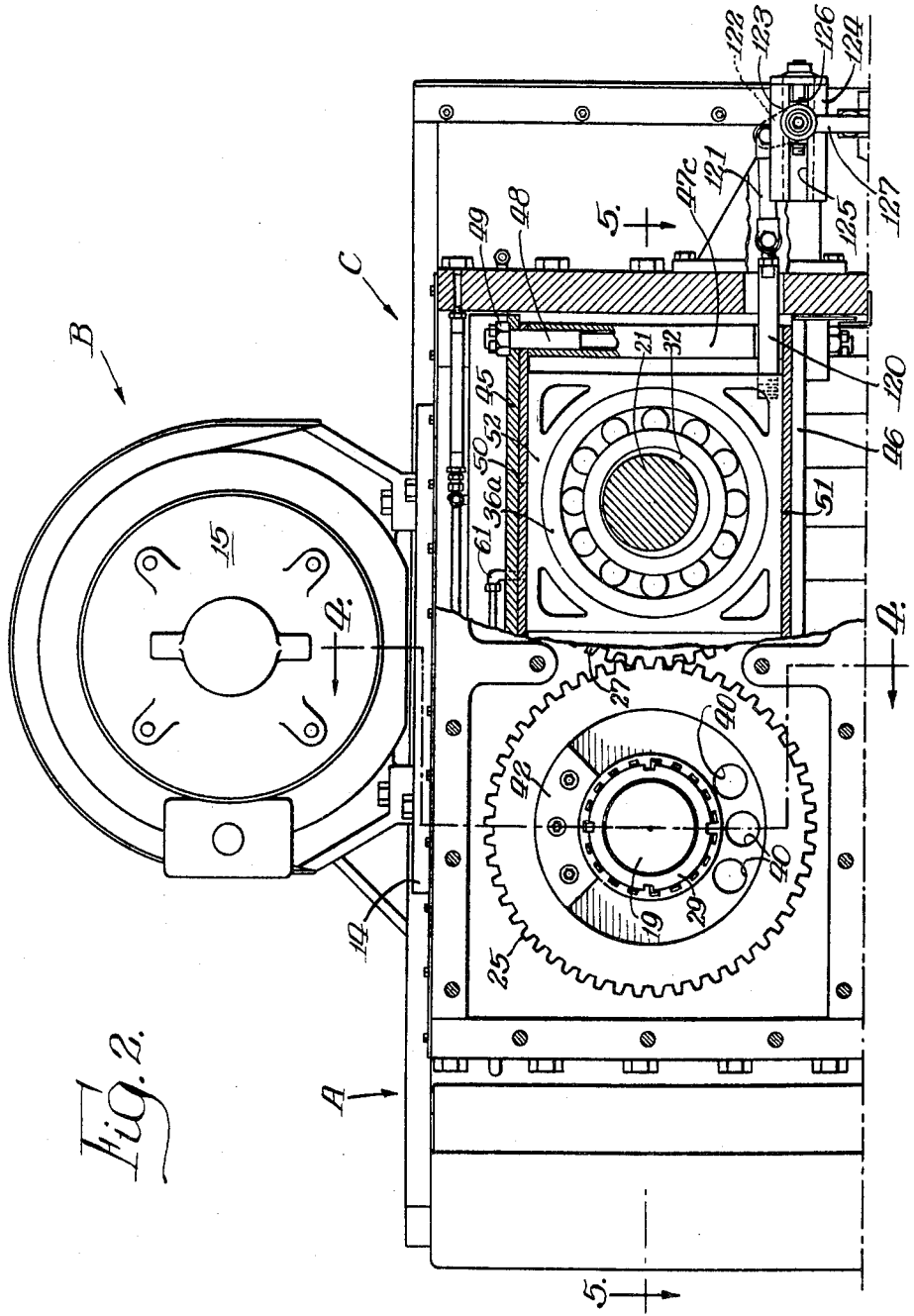
FIG. 2 is a side elevation of the upper portion of the press, partially broken away for clarity of illustration, taken on line 2—2 of FIG. 1.

FIG. 4 is a vertical sectional view of the press taken along line 4—4 of FIGS. 2 and 3; and FIG. 5 is a horizontal sectional view through the upper portion of the press taken along line 5—5 of FIG. 2.

While this invention is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to FIG. 4, the apparatus of this invention is shown as incorporated in a punch press including a frame A which supports at its top a driving mechanism B for driving the crankshaft system C of the press. The crankshaft system is connected to a ram D for reciprocating the same toward and away from the die E of the press, with the die being supported on an adjusting system F.

Figure 1:
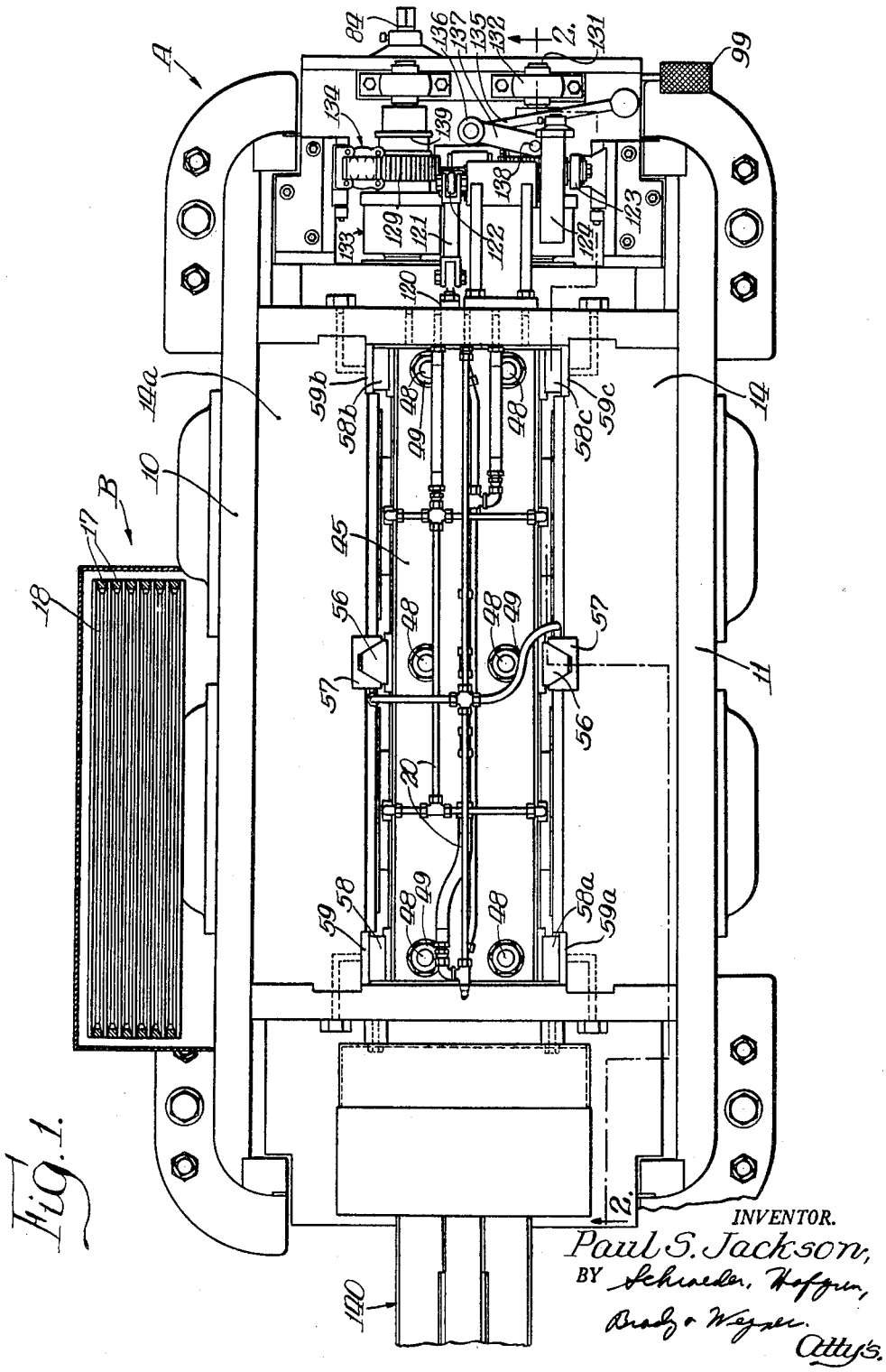
FIG. 1 is a top plan view of a punch press embodying the features of the invention.

The frame includes a pair of vertical steel panels or side plates 10 and 11 which carries the mechanism of the press and which are provided with aligned openings 12 and 13 through which a workpiece is passed through and beneath the ram of the press. Supported at the top of the side plates is a pair of spaced horizontal top plates 14—14a which carry an electric motor 15 for driving the press through the medium of a pulley 16 secured to the drive shaft of the motor which carries a plurality of V-belts 17 engaging a second pulley 18 secured to one of the drive shafts 19 of the press. As best shown in FIG. 1, the top of the ram carries a plurality of oil lines 20 which serve to lubricate various portions of the press, as will hereinafter be described. A transparent plastic cover 14b is secured to the top plates and extends over the space therebetween to prevent oil from splashing upwardly as the ram is reciprocated.

Referring now to FIG. 5, parallel to and horizontally spaced from the crankshaft 19 is a second crankshaft 21, with both crankshafts being rotatably mounted on relatively massive, anti-friction bearings 22 carried by the side plates of the frame. Each of the bearings is mounted on a conical-shaped removable sleeve 23 machined properly to fit the outer surface of the crankshaft and the inside of the inner bearing race of each of the bearings 22. Fixed to the crankshaft 19 adjacent the ends thereof is a pair of gears 24 and 25 which mesh with a similar pair of gears 26 and 27 secured to the crankshaft 21. The gears are in a 1 to 1 ratio so that rotation of the shaft 19 in one direction through the medium of the driving pulley 18 rotates the shaft 21 at the same speed but in the opposite direction. The gears are each mounted on removal sleeves 28 and spaced from the bearings 22 by spacers 30a. The removal sleeves 28 are held in position by nuts 29 which, after being tightened in position, are held against slippage by keyed lockwashers 30.

Integrally formed on each of the crankshafts 19 and 21 is a tapered eccentric 31 and 32. The eccentrics are oppositely positioned so as both to be facing toward the center line of the press in one position and horizontally outward from the center line when rotated 180°, with the eccentrics being in aligned relationship in vertical planes so as to achieve the reciprocation of the ram.

As previously noted, the eccentrics 31 and 32 are tapered toward each end with the oppositely facing tapers on each eccentric being separated by integral rings 33 and 34 which act as spacers for pairs of anti-friction bearings 35 and 35a and 36 and 36a carried by the eccentrics 31 and 32 respectively. It will be noted that the inner surface of the bearing races of each of the anti-friction bearings in said pairs is tapered to facilitate press-fitting the pairs of bearings on the eccentrics. To provide for easy removal of the bearings when their replacement becomes necessary, each crankshaft is drilled as indicated at 37 to form an oil passage communicating with an annular oil groove 38 formed on each taper of each eccentric. Introduction of oil under pressure into the passages 37 and thence to the passages 38 spreads the inner side of the bearing races slightly but sufficiently to permit the bearings to be removed with ease.

Inasmuch as the drive shafts 19 and 21 are not symmetrical but rather are provided with off-center eccentrics, the drive shafts themselves would produce unbalance forces when rotated. To off-set the unbalance of the crankshafts which is equal both at top and bottom dead center, each of the gears 24—27 is provided with drilled openings 40 positioned on the same side of the crankshaft as the eccentricity of the eccentrics and serves to off-set any unbalance produced by such eccentrics. The holes 40 may, if desired, be of a size sufficient only to counterbalance the eccentrics. If desired, the holes may be larger than necessary to counterbalance the eccentrics to further reduce the weight of the counterbalancing mechanism for the entire press. For counterbalancing the ram which is reciprocated by the crankshafts, each of the gears 24—27 is provided with counterbalance weights 41—44 positioned oppositely from the holes 40 with the weights being removably held in a groove formed in the gear by the screw device illustrated. Counterbalance weight of different mass may be required depending upon the weight of the ram and punch assembly; and as punches are changed, which naturally results in a change in the weight of the ram, the counterbalance weights may also be changed. As previously mentioned, the weights may be adjustably fixed on the gears, such as by mounting them on eccentric shafts, so that the weights may be moved inwardly toward or outwardly away from the axis of rotation of the crankshafts to increase or decrease the inertia of the weights and thus to adjust for varying ram weights.

As previously mentioned, slotted crossheads or scotch yokes are employed for translating the rotary movement of the eccentrics into reciprocal movement of the ram. To this end each pair of bearings 35 and 35a and 36 and 36a is mounted in a cross head slidable in suitable ways formed in a crosshead way frame. The crosshead way frame includes an upper plate in the form of a channel member 45 and a lower member 46. The members are maintained in spaced parallel relationship by aluminum spacer blocks 47a, 47b and 47c. Bolts 48 pass through the members and blocks and are provided with suitable nuts 49 to maintain the frame in place. Upper and lower bronze bearing plates 50 and 51 are secured to the inner sides of the members 45 and 46 to provide slide bearings for a pair of crossheads 52 and 53 which in turn are carried by the bearings 35 and 35a, and 36 and 36a. Thus, movement of the eccentrics in a horizontal plane produces merely sliding movement between the crossheads and their ways while movement in vertical planes causes vertical movement of the crossheads and ways. The actual movement of the crossheads is circular but relative to the ways is a horizontal movement back and forth.

Secured to the center spacer block 47b is a pair of V-gibs 56 which extends vertically from top to bottom of the crosshead way frame and are slidable in suitably formed bearing surfaces 57 which are secured to the frame and extend vertically therealong. End gibs 58a and 58c are secured to the end spacer blocks 47a and 47c and are slidable on suitable bearing surfaces 59a and 59c also secured to the framework so as to provide a guided support means for the reciprocating parts of the press. The V construction of the center gibs makes an accurate center guide for the ram and still permits it to expand equally to both ends from the center.

Lubrication of the crossheads in their ways is supplied through the lubricating conduits 20 previously noted. For the purpose of circulating the lubricating fluid, each of the spacer blocks 47a—47c is provided with a lube oil passage 60a—60c. Oil is introduced into suitable interconnected lubricating grooves formed in the bearing surfaces 50 and 51 through a lube oil connection 61 in turn connected to one of the oil lines 20. Lubricating oil in the grooves on the bearing surfaces passes outwardly from the connection of the line 61 thereto and circulates, by means of the spacer block passages 60a—60c, through similar lube oil grooves formed in the lower crosshead bearing surface. A suitable drain connection is provided for the lower bearing surface 51 to produce a continuous circulation of lubricating oil for the crosshead way system.

The ram D comprises a welded steel arm 62 secured at its upper end to the lower crosshead way frame member 46 and provided at its lower end with means for securing thereto a punch holder 63, a punch liner 64 and upper and lower wedges 65. The punch holder, punch liner and upper and lower wedges are held in position on the arm 62 by clamps 66. A stripper plate 67 is carried by upper clamps 68 secured to side rails 69 fixed in the frame.

It will be noted that the ram assembly does not include the usual adjusting screws for adjusting the punches mounted on the punch holder relative to the die of the press. Thus, the weight of the ram is reduced to a minimum without in any manner detracting from, and in fact adding to, its strength.

The reciprocating ram of the press and its attendant accessories is substantially completely counterbalanced by the counterbalance weights attached to the gears hereinbefore described. It will be noted that the weights are located symmetrically about the center line of the reciprocating mass, that is are positioned equidistantly on both sides of such center line and symmetrically front and rear. Because of this symmetrical relationship of the counterbalance weight, no rocking couple is introduced in the system and the weights, when acting in accumulative relationship, counterbalance the primary unbalance of the reciprocating ram and are in opposed relationship 90° from between top and bottom dead center of the ram (where the ram creates no primary unbalance) effectively to cancel out the transverse unbalance of the rotating weights. In the specific embodiment shown, the press is a one hundred ton punch press, the ram weighs about nine hundred pounds and the eccentrics have a quarter inch throw and thus impart a half inch stroke to the ram. Thus, the ram develops an inertia of two hundred twenty-five inch pounds. The counterbalance weights are about five and a half inches from their axes of rotation and, as four are provided, each balances one fourth the mass-moment of the ram, thus each weighs about ten pounds. With the press so counterbalanced, speeds up to five hundred strokes per minute have been achieved without creating vibrations sufficient to tip a coin balanced on edge on the press frame.

The die assembly E comprises a die holder 70 having a suitable groove in which there is located a die shoe 71 which carries a suitably formed die 72. Positioned on either side of the die are lower guides 73. The die holder 70 is clamped to a bottom plate 74 by a die clamp 75 and the bottom plate is bolted to a base plate or platen 76 movably mounted in the frame A. As previously noted, the die assembly E is provided with an adjusting means F for adjusting the die relative to the punches in the punch holder with the adjusting means being mounted on the frame rather than carried by the ram.

The adjusting means F are so designed as to facilitate vertical movement of the die on the frame properly to position it relative to the ram and also to permit rapid replacement of broken punches and the like. The adjusting means F is provided with a plurality of screws 80 having external threads engaging the threads of an internally threaded collar 81 fixed to a lower cross brace 82 in the frame. A housing 83 is fixed to the lower side of the platen 76 and encloses a transversely extending drive shaft 84 carrying a plurality of worms 85 each engaging a worm gear 86 fixed to the lead screws 80. Thus, each of the screws 80 is provided with a worm gear 86 affixed thereto so that rotation of the screws and hence vertical movement of the platen may be achieved by rotating the shaft 84. If desired, a motor may be attached to the shaft 85, which motor may be operated by a suitable manual or pedal control to achieve rotation in either direction of the shaft 84 and hence to raise or lower the platen, and thus the die, toward and away from the ram. It will be noted that the upper face of the worm gear 86 bears against a face portion 87 of the housing 83 and by movement thereagainst with rotation of the screw accomplishes the vertical movement of the platen.

It is necessary after making an adjustment of the die relative to the ram, that is after rotating the adjusting screws 80, that the screws be locked in adjusted position to prevent creeping during the operation of the press. To this end one or more of the lead screws are hollow and provided with locking means to prevent such creeping movement. In the exemplary embodiment of the invention shown, three of the screws 80 are so constructed, thus as seen in FIG. 4, wherein one of such hollow screws is illustrated, there is provided a locking rod 90 secured by means of the key 91 in a hollow 92 formed in the lead screw 80. The keyed connection between the screw and the locking rod is such as to prevent relative rotation between the screw and the rod but to permit sliding longitudinal movement between the rod and the screw. The lower end of the locking rod is threaded at 93 with the threads having the same pitch as the threads formed on the exterior surface of the lead screws 80 and with the threads 93 engaging threads formed in the interior of a worm gear 94. A worm 95 fixed to a rotatable shaft 96 engages the teeth of the gear 94 so that rotation of the shaft 96 causes rotation of the worm gear 94. The upper end 97 of the rod is provided with a collar 98 to hold the rod in position with the lower face of the collar being adapted to bear against the upper portion of the bottom plate 74. A foot treadle 99 (FIG. 3) is provided for rotating the shaft 96 and hence to rotate all of the worm gears 94. Inasmuch as the threads formed at the lower end of the locking rod have the same pitch as the threads on the lead screw and as the key-way 91 causes the screw and rod to rotate together, vertical adjustment of the platen may be achieved through rotation of the shaft 84. The similar pitch of the threads in the rod and screw permits such rotational movement without corresponding rotation of the worm gear 94. When the platen has been moved to the desired position, it is merely necessary for the operator to step on the treadle 99 to cause rotation of the shaft 96 and hence of the worm gears 94. Such movement serves to move the rod 93 downwardly to bring the lower face of the collar against the upper face of the bottom plate and thus to apply sufficient tension on the lead screw and rod as to prevent their rotating with operation of the press. To release the adjusting means for further adjustment, it is merely necessary to rotate the shaft 96 in the opposite direction, thus releasing the locking means.

Means are provided on the press for feeding a workpiece in predetermined increments to the ram and die during the reciprocation of the ram. For this purpose there is mounted on the platen 76 two pairs of feed rolls 100—101 and 100a—101a with the rolls in each pair being vertically arranged and with the pairs being located on opposite sides of the die. The rolls are rotatably mounted on the platen, for example as shown in FIG. 3 the lower rolls 100—100a and upper rolls 101—101a are suitably journaled in bearings 102—102a and 103—103a at each end. Secured to the shaft carrying each of the rolls is an upper drive gear 104 and a lower drive gear 105. The rolls are pressed together by pneumatic piston and cylinder devices 106 mounted at each end of the upper roll and means are provided for operating such devices to separate the rolls slightly to permit insertion of a workpiece in the nip between the rolls. The teeth on the gears 104 and 105 are made extra long so that they remain in mesh in all positions of the upper roll relative to the lower roll. If desired, a lubricant may be supplied to the workpiece by the upper roll 101 and to this end it may be provided with a hollow shaft connected to a suitable lube line 108 which feeds lubricant into the interior of the upper roll from which it is extruded through small openings 109 in the surface of the roll and onto the surface of the workpiece. The lower roll 100 rotates in a pan 110 of lubricant to supply its surface with oil.

A friction clutch, such as the clutch 111, is provided for the lower roll of each pair and is so designed as to prevent rotation of the rolls except through the positive action of feed means hereinafter to be described. Thus, when the rolls are stationary, the workpiece held therein is maintained in fixed relationship relative to the ram and die and backlash or slipping of the rolls and hence of the workpiece is prevented.

The feed rollers 100 and 101 are located at the entering side of the workpiece while the opposite pair of feed rolls 100a and 101a is at the exit side. The upper roll 101a of the exit feed rolls may also be provided with pneumatic devices 112 for raising and lowering the upper roll relative to the lower roll 100a for the purpose of permitting the initial insertion of a workpiece.

Means are provided for rotating both pairs of feed rolls in unison and by predetermined increments to feed a workpiece through the press. To provide for such intermittent movement of the feed rolls there is provided a rod 120 (FIG. 2) threaded into the crosshead 52 and pivotally connected to a second rod 121 in turn connected by a link 122 to a shaft 123 rotatably mounted in the frame. The shaft carries a block 124 provided with a dovetailed groove 125 in which is slidably mounted a block 126 rotatably carrying an actuating rod 127. With operation of the press the rotary movement (relative to the fixed frame) of the crosshead 52 is imparted to the rod 120 and translated by the link 122 into oscillatory movement of the shaft 123 and hence pivotal rocking movement of the block 124. The slide block 126 may be secured in the groove 125 at any desired position away from the axis of rotation of the block so as to impart to the actuating rod 127 whatever degree of vertical reciprocation is desired, ranging from zero, when its pivotal connection to the slide block coincides with the axis of movement of the block 124, to maximum, when the block is adjacent the end of the dovetailed groove.

The actuating rod 127 is connected at its lower end to a vertically reciprocable member 128 having rack teeth thereon engaging teeth 129 on a gear 130 fixed to a clutch shaft 131 having one end journaled in a pillow block 132 fixed to the platen, and having its other end supported in a free-wheeling indexing type clutch 133. The clutch 133 is of well known construction adapted to impart to the drive gear 105 motion in one direction only in response to oscillatory movement of the shaft 131.

The gears 104 and 105 are connected through a gear train (not shown) to similar gears connected to the top and bottom rollers of the other pair of feed rollers so that both pairs of feed rollers are simultaneously driven. The gear corresponding to the gear 105 secured to the roll 100a is connected through a second free-wheeling indexing type clutch, clutch shaft, gear and rack to the piston of an air cylinder 134 which is adapted, when air under pressure is introduced into the cylinder, to rotate both pairs of feed rollers rapidly to advance a workpiece through the press.

The gear 130 may be shifted along the shaft 131 to disengage its teeth from those of the rack 129. To this end there is provided a hand lever 135 pivoted at 136 to the frame and secured to a pair of vertically spaced arms 137 and 137a each carrying detents 138 and 138a which ride in an annular groove 139 formed in the gear 130. Movement of the handle 135 slides the gear teeth out of mesh with the rack teeth to disconnect the feed mechanism.

If a series of perforations are to be made in a workpiece, for example the perforations in the back panel of a radio or television set, a long workpiece may be inserted in the rolls and the press started. Each stroke of the ram punches one row of holes in the workpiece and on each stroke the feed mechanism serves to rotate both pairs of feed rolls and advance the workpiece slightly to determine the spacing between perforations. When the required number of rows of perforations has been punched in the workpiece, the air cylinder 134 is operated, either manually or by suitable automatic controls, rapidly to rotate both pairs of feed rollers a distance greater than their rotation during the feed operation and thus to provide a space between the first series of perforations and a succeeding series. Both feed and rapid speed mechanism operate while the punches are out of contact with the workpiece, that is they operate when the ram is moving upwardly toward top dead center and during only a portion of the ram's movement downwardly toward the die and workpiece. To prevent operation of the air cylinder when the punches are in contact with the workpiece, a suitable limit switch may be incorporated in the electrical energizing means for the air cylinder valve to permit such energization only when the ram is near top dead center.

It will be noted that the feed rolls and most of the feed mechanism is carried by the platen and thus adjustments of the platen upwardly or downwardly do not misalign the feed rolls. If desired, the feed rolls may be provided with an individual adjustment to lower the position of the lower rolls as the dies are reground, thus making it a simple matter to keep the top of the lower roll of each pair in the same plane as the reground die. A similar adjustment is not necessary for the upper rolls inasmuch as the air cylinders with which each of the upper rolls is provided serves to move those rolls downwardly against its associated lower roll.

The die holder 70 is provided with openings at the location of the die, so that the small portions of the workpiece which are punched out by the punches drop therethrough onto a waste conveyor belt 140 suitably mounted on rollers 141, one of which 141a is driven by a motor 142. The belt is driven in the direction indicated by the arrow so that the wasteslugs are carried on the upper surface of the belt toward a chute 143 positioned at the left-hand side of the press (as seen in FIG. 3) and as the belt passes around the first roller 141, such slugs drop off into the waste chute.

I claim:
1. In a feed mechanism for a punch press having a die carried by a frame, a ram reciprocable in the frame, and crosshead ways secured to the ram and slidably supporting a crosshead carried by an eccentric on a drive shaft, means for feeding a workpiece between the die and ram comprising a first pair of feed rolls rotatably mounted on one side of the die and a second pair of feed rolls rotatably mounted on the other side of the die, means for urging each pair of rolls together frictionally to engage a workpiece in the nip of the rolls, gear means including a spur gear, directly connected through a unidirectional clutch to at least one roll in each pair for rotating said one roll, and means for rotating the gear means to feed a workpiece in the feed rolls between the ram and die, said rotating means including a bar having a dovetail slot therein and rockably mounted on the frame, a linkage connecting the bar to the crosshead to convert horizontal and vertical components of movement of the crosshead into rocking movement of the bar, another linkage for connecting the bar to said spur gear, a block slidably received in said slot and secured to said other linkage, means for securing the block in the slot in any one of a plurality of positions to vary the extent of the motion imparted to the gear means thereby, and means for disengaging said gear means from said rotating means including a lever operatively connected to said spur gear for moving the spur gear out of operative connection with said other linkage.

2. In a feed mechanism for a punch press having a die carried by a frame, a ram reciprocable in the frame, and crosshead ways secured to the ram and slidably supporting a crosshead carried by an eccentric on a drive shaft, means for feeding a workpiece between the die and ram comprising a first pair of feed rolls rotatably mounted on one side of the die and a second pair of feed rolls rotatably mounted on the other side of the die, means for urging each pair of rolls together frictionally to engage a workpiece in the nip of the rolls, a friction clutch connected to at least one of the rolls, gear means including a spur gear, directly connected through a unidirectional clutch to at least one roll in each pair for rotating said one roll, and means for rotating the gear means to feed a workpiece in the feed rolls between the ram and die; said rotating means including a shaft rotatably mounted on the frame, a bar carried intermediate its ends by one end of said shaft, said bar having a dovetail slot therein, a lever arm secured to the other end of said shaft, a linkage connecting said lever arm to the crosshead, whereby the vertical and horizontal components of movement of said crosshead are converted into rocking movement of said bar; another linkage for connecting the bar to said spur gear, a block slidably received in said slot and secured to said other linkage, means for securing the block in the slot in any one of a plurality of positions to vary the extent of the motion imparted through the gear means thereby, and means for disengaging said gear means from said rotating means including a lever operatively connected to said spur gear for moving the spur gear out of connection with said other linkage.

References Cited in the file of this patent

UNITED STATES PATENTS

| | | |
|---|---|---|
| 704,941 | Slick | July 15, 1902 |
| 1,205,895 | Hoyt | Nov. 21, 1916 |
| 1,858,403 | Littell | May 17, 1932 |
| 1,867,343 | Wittek | July 12, 1932 |
| 1,947,015 | Littell | Feb. 13, 1934 |
| 2,006,040 | Crane | June 25, 1935 |
| 2,285,939 | Neumair | June 9, 1942 |
| 2,610,524 | Maussnest | Sept. 16, 1952 |

FOREIGN PATENTS

| | | |
|---|---|---|
| 373,727 | France | Mar. 27, 1907 |
| 277,862 | Italy | Sept. 23, 1930 |